United States Patent

[11] 3,623,607

| [72] | Inventor | John F. Loos |
| | | San Diego, Calif. |
| [21] | Appl. No. | 845,473 |
| [22] | Filed | July 28, 1969 |
| [45] | Patented | Nov. 30, 1971 |
| [73] | Assignee | Gulf Oil Corporation |
| | | San Diego, Calif. |

[54] FILTER ASSEMBLY
11 Claims, 4 Drawing Figs.

[52] U.S. Cl. .................................................. 210/106, 210/355
[51] Int. Cl. ...................................................... B01d 35/16
[50] Field of Search ............................................ 210/106, 355, 413

[56] References Cited
UNITED STATES PATENTS

| 598,190 | 2/1898 | Wilcox | 210/355 X |
| 1,651,866 | 12/1927 | Bowers | 210/413 X |
| 2,015,355 | 9/1935 | Snow et al. | 210/106 X |
| 2,089,214 | 8/1937 | Lomax | 210/413 X |
| 3,454,164 | 7/1969 | Asper | 210/413 X |

FOREIGN PATENTS

| 903,248 | 8/1962 | Great Britain | 210/413 |

Primary Examiner—Samih N. Zaharna
Attorney—Fitch, Even, Tabin & Luedeka

ABSTRACT: A self-cleaning filter assembly is described including a free piston which moves periodically to clean a surface of the filter element, or to flush concentrated fluids or solids from the filter assembly. Movement of the piston is accomplished automatically by a valve arrangement which directs pressurized fluid to an appropriate side of the piston.

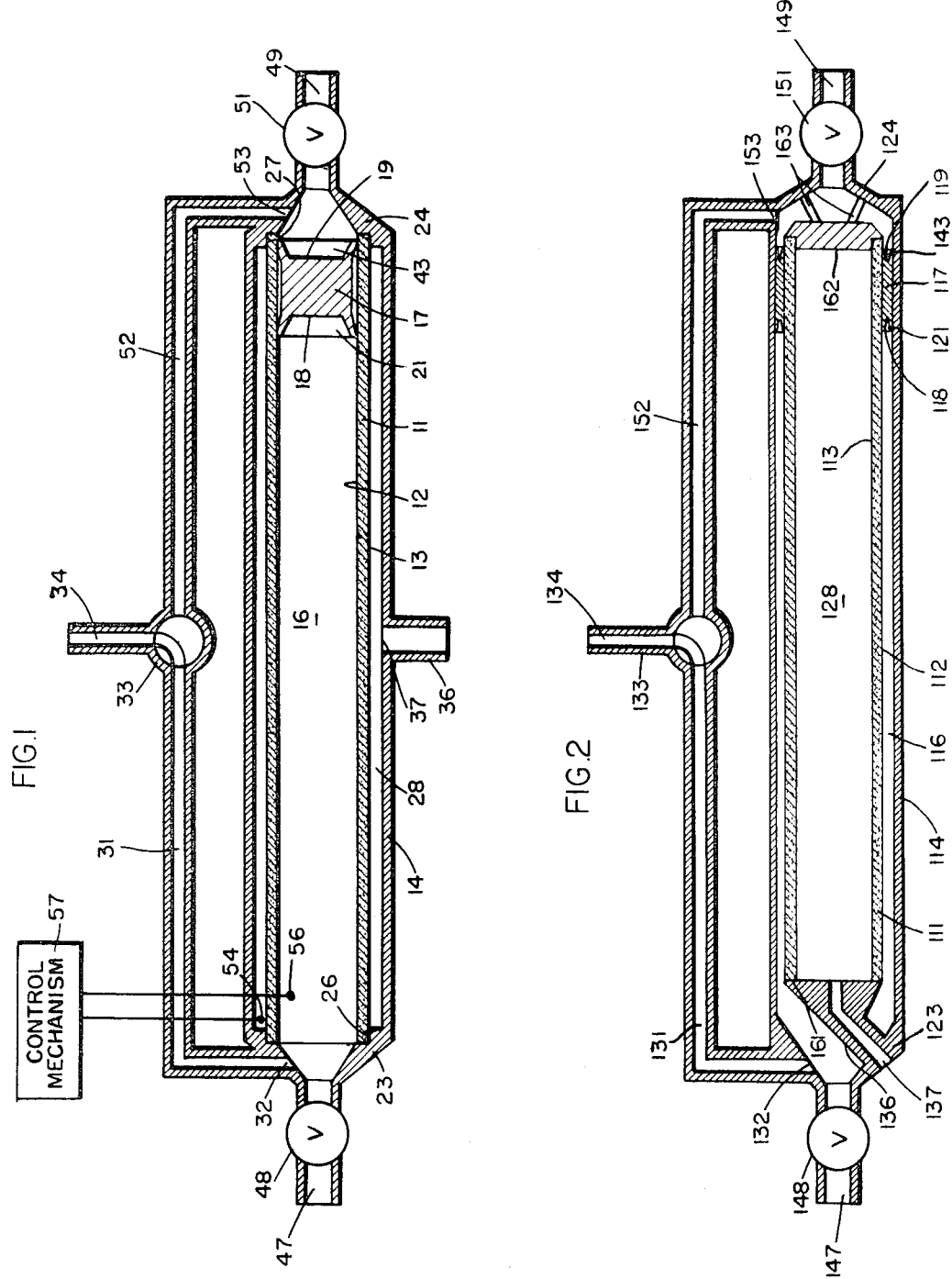

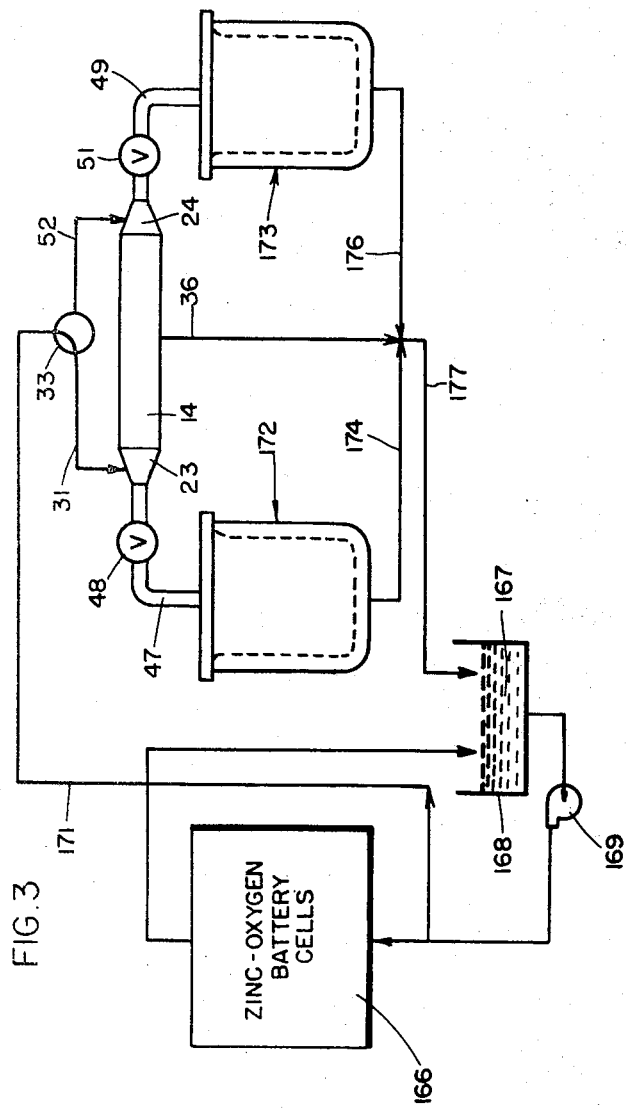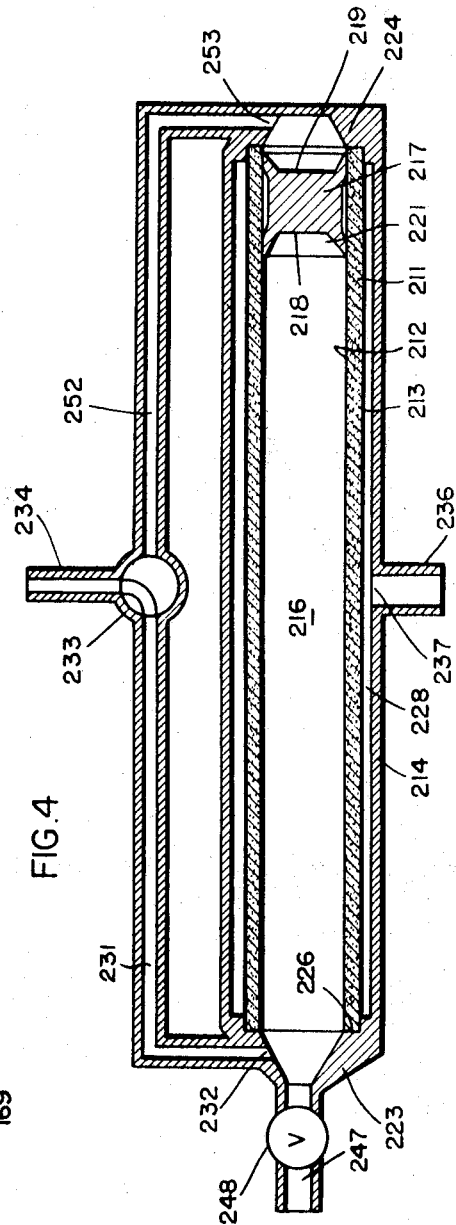

FILTER ASSEMBLY

This invention relates to filters and, more particularly, to an improved filter assembly in which provision is made for periodically cleaning the filter element or flushing the filter assembly.

Many fluid systems utilize filter assemblies for removing solids or semisolids from a fluid, or for separating fluid constituents. Typically, such filter assemblies include provision for introducing pressurized fluid to be filtered into a region on one side of a filter element such that certain constituents of the fluid to be removed or concentrated are accumulated on the one side of the filter element and only a filtrate passes through the filter to the other side. The filter element may be of any suitable construction depending upon the particular fluids and constituents involved.

After certain periods of operation, filter elements may become clogged with solids or semisolids such as to require cleaning. Furthermore, in the case of a filter assembly utilized for separating constituent fluids, the concentration of one particular constituent fluid on one side of the filter element may reduce the efficiency of the filtering process unless it is periodically flushed from this region. Moreover, under some circumstances, it may be desirable to clean the filter element in such a manner as to recover filtered out solids or semisolids, or to flush the filter assembly to recover accumulated concentrated solids or fluids. For example, in systems involving high suspensions of solids in a slurry where it is desired to recover the filter cake for subsequent processing, such as in the case of an electrolyte-circulating system for a zinc oxygen battery or a system for recovering food materials, ore, face powder, etc., it is desirable to have a system for cleaning the filter element which enables ready recovery of the filter cake.

Filtering arrangements including means for periodically cleaning the surface of the filter element are known in the art. Typically, such prior art systems have included a hand- or motor-driven scraper device which operates periodically for cleaning the filter. Such systems tend to be relatively costly and introduce a separate operating system with a consequent reduction in reliability.

Accordingly, it is an object of this invention to provide an improved filter assembly.

Another object of the invention is to provide a filter assembly which is self-cleaning, thereby not requiring the use of separate means of motive power for cleaning elements.

It is another object of the invention to provide a filter assembly which is particularly adapted for use in systems involving high suspensions of solids in a slurry and where it may be desired to recover the filter cake for subsequent processing.

A further object of the invention is to provide a filter assembly which may be used to concentrate fluids and which will periodically flush the concentrated fluids.

Various other objects of the invention will become apparent to those skilled in the art from the following description taken in connection with the accompanying drawings wherein:

FIG. 1 is a schematic sectional view of a filter assembly constructed in accordance with the invention;

FIG. 2 is a schematic sectional view of a further embodiment of the invention;

FIG. 3 is a schematic diagram of a fluid system in which the filter assembly of the invention has particular applicability; and FIG. 4 is a schematic sectional view of a further embodiment of the invention.

Very generally, the filter assembly of the invention comprises an elongated filter element 11 having first and second opposing sides 12 and 13. A housing 14 forms, with the filter element, an elongated chamber 16 on the first side of the filter element. A free piston 17 having first and second opposing sides 18 and 19 is movable within the chamber between the first and second positions toward opposite ends of the chamber, respectively. The piston has at least one portion 21 thereon for cleaning the first side of the filter element when the piston moves between the first and second positions. Means are provided for introducing fluid under pressure to the chamber on the first side of the piston to hold the piston in the first position, and for introducing fluid under pressure to the chamber on the second side of the piston and relieving pressure on the first side thereof to move the piston from the first position to the second position and thereby clean the filter.

Referring now particularly to FIG. 1, the elongated filter element 11 is tubular in shape having inner and outer opposing sides 12 and 13 consisting of coaxial cylindrical surfaces. The filter element defines the cylindrical chamber 16. The precise material of which the filter element is comprised depends upon a particular application of the filter assembly of the invention. Thus, the filter element 11 may be of a porous material which allows liquid to pass therethrough from the side 12 to the side 13 while blocking and accumulating solids suspended in the liquid on the side 12. Another type of filter element which may be used is a membrane which allows fluids of a certain characteristic to permeate and pass through while the other fluids do not. Such a membrane may be used to recover the filtrate, or to concentrate certain fluids. A membrane of the type used in so-called reverse osmosis systems for purifying water is one example.

The housing 14 is generally in the shape of a hollow cylinder having a pair of frustoconical end walls 23 and 24 at opposite ends. The filter element 11 extends between the end walls 23 and 24, being supported in an annular recess 26 in the end wall 23 and an annular recess 27 in the end wall 24. The cylindrical housing 14 is coaxial with the cylindrical filter element 11 and is spaced therefrom to form a chamber 28 of annular cross section between the outside 13 of the filter element 11 and the wall of the housing 14.

An inlet conduit 31 communicates through an opening 32 in the frustoconical end wall 23 with the chamber 16 defined by the filter element 11. The fluid-introducing means include a three-way or directional control valve 33 which connects the conduit 31 with a valve inlet conduit 34. Slurry from which suspended solids are to be removed or recovered, or solution from which constituent fluids are to be removed or concentrated, is introduced to the valve inlet conduit 34 under pressure and passes through the valve 33 and the conduit 31 into the chamber 16. The slurry or solution is then separated or concentrated as some fluid passes through the filter element 11 and into the chamber 28. The chamber 28 is drained through a filtrate outlet tube 36 which connects with the chamber 28 through an opening 37 in the cylindrical wall of the housing 14.

During filtering operations, solids which do not pass through the filter element 11 buildup on the surface 12 in a cake form. Eventually, this buildup may significantly reduce the flow of liquid through the filter element 11 and thereby reduce the efficiency of the filter assembly. Accordingly, it may be desirable that the surface 12 of the filter element be periodically cleaned to remove the cake buildup. Additionally, it may be desirable to remove the cake in order to recover it for future use, such as in some types of food processing, ore recovery, face powder manufacture, and in zinc-oxygen battery systems where zinc oxide is recovered from circulating electrolyte. In the case of fluid separation or concentration, provision should be made for periodically removing fluid which accumulates on the inlet side of the filter element by flushing the filter assembly.

To accomplish such cleaning or flushing, the free piston 17 is disposed within the chamber 16. In the illustrated filter assembly, which is for recovering solids from a slurry, the main body of the piston 17 is of a diameter to provide some clearance between the piston and the cylindrical surface 12. However, two annular scraper portions 21 and 43 project from the opposite sides 18 and 19 of the piston 17, respectively, and engage the cylindrical inner surface 12 of the filter element 11. The cross section of the projecting scraper portions 21 and 43 is of a wedgelike shape.

An outlet tube 47, closeable and openable by means of a presure-relieving means or valve 48, is provided centrally of the end wall 23 in order that the built-up cake and slurry may be pushed out of the chamber 16 by movement of the piston 17. A further outlet conduit 49, openable and closeable by means of a pressure-relieving means or valve 51, is provided in the end wall 24 in order that the piston may push removed filter cake and slurry out of the chamber 16. In the case of fluid separation, it may not be necessary to employ scraper portions on the piston or to utilize as large outlet tubes as are illustrated.

With the valve 33 operated in the position illustrated such that pressurized fluid enters the chamber 16 through the opening 32, the piston 17 will be held in the position shown, that is, at the end of the chamber 16 toward the end wall 24. In order to enable the piston 17 to be moved toward the opposite end wall 23 for cleaning the surface 12 of the filter element 11, or for flushing the chamber 16, a conduit 52 is provided connecting the valve 33 to the chamber 16 through an opening 53 in the end wall 24 of the housing. Since the opening 53 is in the end wall 24, any fluid introduced into the chamber 16 through such opening is on the side 19 of the piston 17, opposite from the side 18 which faces toward the opening 32 in the end wall 23. When it is desired to clean the filter element, the valve 33 is operated from the position shown to a position wherein the valve inlet conduit 34 is connected to the conduit 52. Pressurized fluid then enters the chamber 16 on the side 19 of the piston 17 and no longer enters the chamber through the opening 32. With the valve 51 closed and the valve 48 open, the resultant pressure on the side 19 of the piston forces the piston from the illustrated position toward the end wall 23. When the piston 17 moves along the chamber 16 toward the end wall 23, the scraper portion 21 removes cake built up on the surface 12 and the piston pushes such removed cake along with any slurry remaining in the chamber 16 toward the end wall 23, forcing the contents of the chamber 16 out through the conduit 47. When the piston reaches the opposite end of the chamber 16, the chamber 16 once again filled with slurry for filtering. When cleaning is again necessary, the valve 33 is returned to the original illustrated position, the valve 51 is opened and the valve 48 closed so that the piston 17 returns to the illustrated position. When the piston 17 moves along the chamber 16 from the end thereof nearest the end wall 23 toward the end wall 24, the scraper portion 43 removes cake built up on the surface 12 and the piston pushes such cake along with any slurry remaining in the chamber 16 toward the end wall 24, forcing the contents of the chamber 16 out through the conduit 49.

Control of the cycling rate of the piston 17 from one end of the chamber to the other to effect cleaning of the filter element 11 may be accomplished by a variety of means, depending upon the application. For example, a timer mechanism may be employed to actuate the valve 33 at predetermined intervals. In the illustrated embodiment, the increase in pressure drop across the filter element 11 is sensed by a pair of sensor elements 54 and 56 and is responsive to the attainment of a given pressure differential between the chambers 16 and 28 to provide actuation of the valve 33. The control mechanism may, for example, include a pressure switch operable to provide an electrical signal for energizing a suitable valve actuator. Power for valve operation may be provided by electric, hydraulic, or pneumatic actuators with an external energy source, or the system pressure itself may be used as the energy source.

From the foregoing description, it may be seen that the filter assembly of the invention is self-cleaning, that is, the energy for actuating and moving the cleaning element is produced by the fluid system in which the filter assembly is incorporated. The filter assembly readily lends itself to automatic operations and can thereby provide filtration of fluids on a more continuous basis, that is, with fewer lengthy interruptions in filtration, than previously known devices. The filter assembly of the invention may be used for the removal of unwanted fluids, solids or semisolids from solutions or suspensions, or may be used to concentrate a particular solution or suspension.

Referring now to FIG. 2, an alternate embodiment of the invention is shown. Parts of the embodiments in FIG. 2 corresponding in function to similar parts in the embodiment of FIG. 1 have been given identical reference numerals preceded by a 1. The particular embodiment of FIG. 2 may be advantageous in the case of large diameter filter elements where it is desirable to minimize the amount of slurry which is removed along with the filter cake. To this end, the inlet chamber 116 is of annular cross section surrounding the filter element 111, and the chamber 128 where the filtrate is collected is the interior of the filter element 111. Since the positions of the inlet chamber and the filtrate outlet chamber are reversed, the piston 117 is of annular configuration and is provided with annular scraper portions 121 and 143 of appropriate configuration for scraping the outside or outer surface 112 of the filter element 111. The filtrate outlet 136 is inside the housing 114, communicating therethrough through the opening 137 in the frustoconical end wall 123. The filtrate outlet 136 terminates in a support portion 161 which is suitably secured to one end of the filter element 111 for supporting same. The opposite end of the filter element is closed by a plug 162 which is supported by a plurality of struts 163 extending from the frustoconical end wall 124 of the housing 114.

Operation of the filter assembly of FIG. 2 is essentially the same as that of the filter assembly of FIG. 1. In the embodiment of FIG. 2, however, it is possible to utilize a very large diameter filter element 111 without producing a corresponding increase in the size of the chamber 116. This is because the inner diameter of the housing 114 may be made to conform closely with the outer diameter of filter element, thereby minimizing the size of the chamber 116. Accordingly, the amount of slurry which it is necessary to remove along with the caked material during movement of the piston 117 is minimized.

Referring now to FIG. 3, a typical application of the filter of the invention is illustrated, utilized in a circulating-fluid system. The illustrated system is for use in circulating electrolyte through a zinc-oxygen battery and for removing the product of the electrochemical reaction of the battery, zinc oxide, and collecting and storing it for further use. The collected and stored zinc oxide may then be reprocessed into zinc plates for use in the zinc-oxygen battery cells.

A zinc-oxygen battery 166 has electrolyte 167 circulated therethrough from a reservoir 168 by means of a pump 169. As is known in the art, during the electrochemical reaction of a zinc-oxygen battery, zinc oxide is produced. Such zinc oxide is removed from he battery 166 by the circulating electrolyte and is conducted in a zinc oxide slurry mixture through a line 171 to a self-cleaning filter constructed in accordance with the invention. In the illustrated system, the filter assembly utilized is that shown in the embodiment of FIG. 1, and the visible parts are appropriately numbered. The outlet 47 is connected to a wire basket 172 and the outlet 49 is connected to a wire basket 173. The wire baskets serve to collect and store the zinc oxide cake removed through the outlets 47 and 49 by action of the piston, not shown, within the filter assembly. Electrolyte passing through the baskets 172 and 173 is conducted through conduits 174 and 176, respectively, to join the electrolyte from the filtrate outlet 36 of the filter assembly in a conduit 177. The conduit 177 returns the electrolyte to the electrolyte reservoir 168.

Under some circumstances, it may be desirable to remove occasional contaminants from a fluid, such as in an automobile oil filter system. In such a system, a single-acting filter assembly constructed in accordance with the invention may be utilized. Such an assembly is shown in FIG. 4, and elements thereof having functions similar to the elements of the embodiment of FIG. 1 have been given identical reference numerals preceded by a 2.

In the embodiment illustrated in FIG. 4, the filter assembly is single acting in the sense that the filter cake is removed by the piston 217 moving only to the left to push the accumulated cake and accompanying slurry out through the conduit 247. The threeeway valve 233 remains normally as indicated and the valve 233 is moved to conduct slurry through the conduit 252, and the valve 248 is opened. Accordingly, the piston 217 is moved to the left with the scraper portion 221 thereof removing filter cake and accompanying slurry by pushing it through the conduit 247. Immediately after the piston 217 reaches the end of the chamber 216 adjacent the wall 223, the valve 233 is returned to its illustrated position and the valve 248 is closed. The flow of liquid through the filter element is usually sufficient to relieve the pressure in the chamber 216 and allow the piston 217 to return to the illustrated position. After long operation, however, some cake buildup may occur, and a slurry outlet conduit (not shown) in the wall 224 having a manually operable valve (also not shown) may be provided. The unillustrated conduit need not be as large as the outlet conduit 247 and the slurry removed therethrough may be discarded or recirculated to the inlet 234 as desired.

It may therefore be seen that the invention provides an improved filter assembly which is adaptable to a variety of particular uses, such as purifying, recovery of solids, and concentration of fluids. The invention provides continuous filtration of fluids with automatic expulsion of filter cake or concentrated fluids after a period of time. No auxiliary power is required to operate the expulsion means, thereby minimizing expense and enhancing reliability.

Various modifications of the invention in addition to those shown and described herein will become apparent to those skilled in the art from the foregoing description and accompanying drawings. Such modifications are intended to fall within the scope of the appendant claims.

What is claimed is:

1. A filter assembly comprising an elongated filter element having first and second opposing sides, a housing forming with said filter element an elongated chamber on said first side of said filter element for receiving fluid to be filtered, means for collecting filtered fluid passing through said filter element to said second side thereof, a free piston having first and second opposing sides and being movable within said chamber between first and second positions toward opposite ends of said chamber, respectively, means for introducing fluid to be filtered under pressure to said chamber on said first side of said piston to hold said piston in said first position, means for opening said chamber on said first side of said piston, and means for introducing fluid to be filtered under pressure to said chamber on said second side of said piston to move said piston from said first position to said second position for removing the contents of said chamber.

2. A filter assembly according to claim 1 wherein said filter element is tubular and wherein said first and second opposing sides thereof are coaxial cylindrical surfaces.

3. A filter assembly according to claim 2 wherein said piston includes at least one annular scraper thereon for cleaning said first side of said filter element when said piston is moved.

4. A filter assembly comprising an elongated tubular filter element having first and second coaxial opposing sides, a housing forming with said filter element an elongated first chamber on said second side of said filter element, the interior of said filter element constituting a second chamber for receiving fluid to be filtered, means for collecting filtered fluid passing through said filter element to said second side thereof, a free piston having first and second opposing sides and being movable within said second chamber between first and second positions toward opposite ends of said second chamber, respectively, means for introducing fluid to be filtered under pressure to said second chamber on said first side of said piston to hold said piston in said first position, means for opening said second chamber on said first side of said piston, and means for introducing fluid to be filtered under pressure to said second chamber on said second side of said piston to move said piston from said first position to said second position for removing the contents of said second chamber.

5. A filter assembly according to claim 2 wherein said first side of said filter element is the exterior surface, wherein said chamber surrounds a substantial portion of said filter element, and wherein said piston is annular in shape and surrounds said filter element coaxial therewith.

6. A filter assembly according to claim 1 wherein said introducing means comprise a valve operable between two states for directing fluid under pressure to said chamber on said first and second sides of said piston, respectively.

7. A filter assembly according to claim 6 wherein said opening means comprise a normally closed first port in said housing opening to said chamber at one end thereof and on said first side of said piston, said port being openable to allow said piston to push the contents of said chamber therethrough.

8. A filter assembly according to claim 7 wherein said housing is provided with a normally closed second port therein opening to said chamber at one end thereof and on said second side of said piston, said second port being openable to allow said piston to push the contents of said chamber through said second port when said piston is returned from said second position to said first position thereof.

9. A filter assembly according to claim 8 wherein said piston includes a pair of annular scrapers thereon on said first and second sides, respectively, for cleaning said filter element, whereby said valve may be switched from one state to the other after predetermined periods of operation to periodically clean said filter element.

10. A filter assembly according to claim 8 wherein said piston has a single portion thereon on said first side for cleaning said filter, and wherein said valve is operable from one state to the other after a predetermined period of operation to clean said filter element, and is operable immediately thereafter back to its original state to return said piston to said first position.

11. A filter assembly according to claim 6 including means for sensing a predetermined condition in said filter assembly requiring movement of said piston, and means for operating said valve from one state to the other in response to the sensing of the predetermined condition.

* * * * *

UNITED STATES PATENT OFFICE
CERTIFICATE OF CORRECTION

Patent No. 3,623,607      Dated November 30, 1971

Inventor(s) John F. Loos

It is certified that error appears in the above-identified patent and that said Letters Patent are hereby corrected as shown below:

Column 3, line 37 - before "once" insert "is".

Column 3, line 56 - after "elements 54 and 56" insert "disposed within the chambers 28 and 16, respectively. A control mechanism 57 is connected to the sensor elements 54 and 56".

Signed and sealed this 25th day of April 1972.

(SEAL)
Attest:

EDWARD M. FLETCHER, JR.
Attesting Officer

ROBERT GOTTSCHALK
Commissioner of Patents